United States Patent
Ishii et al.

(10) Patent No.: US 9,957,012 B2
(45) Date of Patent: May 1, 2018

(54) VEHICLE BODY FRAME STRUCTURE OF STRADDLE-TYPE VEHICLE

(71) Applicant: Kawasaki Jukogyo Kabushiki Kaisha, Kobe-shi, Hyogo (JP)

(72) Inventors: Hiroshi Ishii, Kobe (JP); Tomo Yamamoto, Kobe (JP); Daisuke Saeki, Kakogawa (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 79 days.

(21) Appl. No.: 15/034,161

(22) PCT Filed: Nov. 7, 2013

(86) PCT No.: PCT/JP2013/006568
§ 371 (c)(1),
(2) Date: May 3, 2016

(87) PCT Pub. No.: WO2015/068188
PCT Pub. Date: May 14, 2015

(65) Prior Publication Data
US 2016/0264204 A1    Sep. 15, 2016

(51) Int. Cl.
*B62K 19/18* (2006.01)
*B62K 11/04* (2006.01)
(Continued)

(52) U.S. Cl.
CPC .............. *B62K 11/04* (2013.01); *B62H 1/02* (2013.01); *B62K 19/18* (2013.01); *B62K 25/283* (2013.01)

(58) Field of Classification Search
CPC ........ B62K 11/04; B62K 11/02; B62K 19/18; B62K 25/283; B62K 19/00; B62K 19/24
See application file for complete search history.

(56) References Cited

U.S. PATENT DOCUMENTS 4,066,142 A * 1/1978 Hooper .................. B62K 11/04
                                                            180/228
4,480,712 A * 11/1984 Inoue ...................... B62M 7/02
                                                            123/559.1
(Continued)

FOREIGN PATENT DOCUMENTS

EP    1382521 A1    1/2004
JP    S62125968 A   6/1987
(Continued)

OTHER PUBLICATIONS

ISA Japanese Patent Office, International Search Report Issued in Application No. PCT/JP2013/006568, dated Feb. 10, 2014, WIPO, 3 pages.
(Continued)

*Primary Examiner* — Joseph M Rocca
*Assistant Examiner* — Michael R Stabley
(74) *Attorney, Agent, or Firm* — Alleman Hall Creasman & Tuttle LLP (57) ABSTRACT

Provided is a vehicle body frame structure which can reduce a burden in the assembly of a straddle-type vehicle. The vehicle body frame comprises a main frame; and a rear frame connected to and extending rearward from the main frame. The main frame includes first and second members which are connected to each other. The main frame includes first and second connection portions spaced apart from each other in a direction perpendicular to a vehicle width direction. The connection portions are provided at the first member and the second member, respectively. The rear frame includes a first connected portion connected to the first connection portion by a first fastener member, and a second connected portion connected to the second connection portion by a second fastener member. The restricting
(Continued)

direction of the first fastener member is orthogonal to the restricting direction of the second fastener member.

11 Claims, 5 Drawing Sheets

(51) Int. Cl.
  *B62K 25/28* (2006.01)
  *B62H 1/02* (2006.01)

(56) References Cited

U.S. PATENT DOCUMENTS

| | | | | |
|---|---|---|---|---|
| 5,782,313 A * | 7/1998 | Kurawaki | ............... | B62K 25/12 180/219 |
| 5,921,339 A * | 7/1999 | Matsuura | ............... | B62K 11/04 180/219 |
| 6,318,743 B1 * | 11/2001 | Nakashima | ............... | B62J 15/00 180/219 |
| 7,267,193 B2 * | 9/2007 | Nagashii | ............... | B62K 11/04 180/219 |
| 7,404,463 B2 * | 7/2008 | Saiki | ............... | B62K 11/04 180/229 |
| 7,490,689 B2 * | 2/2009 | Seki | ............... | B62K 11/04 180/229 |
| D590,303 S * | 4/2009 | Ueno | ............... | D12/114 |
| 7,699,134 B2 * | 4/2010 | Terashima | ............... | B62K 19/30 180/219 |
| 7,770,683 B2 * | 8/2010 | Keogh | ............... | B62K 5/027 180/210 |
| 7,883,136 B2 * | 2/2011 | Tomolillo | ............... | B60J 1/04 296/180.5 |
| 7,887,077 B2 * | 2/2011 | Thiers | ............... | B60G 3/14 180/6.24 |
| 7,934,738 B2 * | 5/2011 | Prielinger | ............... | B62K 11/04 180/219 |
| 8,408,575 B2 * | 4/2013 | Kawai | ............... | B62K 11/04 280/281.1 |
| 8,448,738 B2 * | 5/2013 | Goto | ............... | B62K 11/04 180/219 |
| 8,453,780 B2 * | 6/2013 | Yamamoto | ............... | B62K 11/04 180/219 |
| 8,453,781 B2 * | 6/2013 | Kawai | ............... | B60T 8/3685 180/219 |
| 8,534,407 B2 * | 9/2013 | Koda | ............... | B62J 1/08 180/219 |
| 8,851,496 B2 * | 10/2014 | Hedtke | ............... | B62K 11/04 180/219 |
| 2009/0242305 A1 * | 10/2009 | Asano | ............... | B62K 11/04 180/219 |
| 2009/0243253 A1 | 10/2009 | Morita | | |
| 2013/0270038 A1 * | 10/2013 | Nitta | ............... | B62K 11/04 184/6 |
| 2014/0367183 A1 * | 12/2014 | Matsuda | ............... | B62K 11/04 180/220 |

FOREIGN PATENT DOCUMENTS

| | | |
|---|---|---|
| JP | 2004098875 A | 4/2004 |
| JP | 2013203125 A | 7/2013 |

OTHER PUBLICATIONS

ISA Japanese Patent Office, Written Opinion of the International Searching Authority Issued in Application No. PCT/JP2013/006568, dated Feb. 10, 2014, WIPO, 4 pages.

European Patent Office, Extended European Search Report Issued in European Application No. 13897020.7, dated Aug. 21, 2017, Germany, 8 pages.

* cited by examiner

VEHICLE BODY FRAME STRUCTURE OF STRADDLE-TYPE VEHICLE

TECHNICAL FIELD

The present invention relates to a vehicle body frame structure of a straddle-type vehicle such as a motorcycle. For example, the present invention relates to a vehicle body frame structure including a rear frame connected to a main frame by a fastener member.

BACKGROUND ART

As disclosed in Patent Literature 1, an exemplary vehicle body frame structure of a straddle-type vehicle includes a rear frame on which a seat is placed. The rear frame includes, at a front end portion thereof, a plurality of connected portions connected to a main frame. These connected portions are caused to overlap with the main frame from the side, and fastener members such as bolts are inserted in a vehicle width direction into a plurality of overlap portions of the rear frame and the main frame. In this way, the rear frame is connected to the main frame.

CITATION LIST

Patent Literature

Patent Literature 1: EP 1382521 A1

SUMMARY OF INVENTION

Technical Problem

In the above-described connection method, the fastener members are inserted in the vehicle width direction into all of the connected portions. For this reason, in a case where the main frame has a major assembling error, it becomes necessary to correct the distortion of the main frame to connect the rear frame to the main frame. This correction of the frame structure increases a burden in the assembling operation of the frame structure and thus the whole of the straddle-type vehicle. This problem may arise in cases which are different from the case where the rear frame is connected to the main frame.

In view of the above, an object of the present invention is to provide a vehicle body frame structure which can reduce the burden in the assembling operation of the straddle-type vehicle.

Solution to Problem

According to the present invention, a vehicle body frame structure of a straddle-type vehicle comprises a main frame; and a rear frame connected to the main frame by a fastener member and extending rearward from the main frame, wherein the main frame includes a first member and a second member which are connected to each other, the main frame includes a first connection portion and a second connection portion which are connected to the rear frame, the first connection portion is provided at the first member, the second connection portion is provided at the second member, and the first connection portion and the second connection portion are spaced apart from each other in a direction which is perpendicular to a vehicle width direction of the straddle-type vehicle, wherein the rear frame includes a first connected portion connected in a first restricting direction to the first connection portion by a first fastener member, and a second connected portion connected in a second restricting direction to the second connection portion by a second fastener member, and wherein the first restricting direction is orthogonal to the second restricting direction.

In accordance with this configuration, since the first connection portion and the second connection portion are separately provided at the first member and the second member, respectively, an assembling error between the first connection portion and the second connection portion is highly likely to occur. Since the first restricting direction of the first fastener member is orthogonal to the second restricting direction of the second fastener member, an error in directions different from the first and second restricting directions are permitted, and as a result, an increase in a burden in an assembling operation, which would be caused by the correction of the main frames, can be prevented.

The first connection portion and the second connection portion may be detachably coupled to the first connected portion and the second connected portion, respectively, the first connection portion may be permitted to be displaceable within a specified range in a direction different from the first restricting direction, and the second connection portion may be permitted to be displaceable within a specified range in a direction different from the second restricting direction.

In accordance with this configuration, the rear frame can be connected to the main frame while suppressing the distortion of the main frame and the distortion of the rear frame.

The first connected portion and the second connected portion may be integrally formed by molding.

In accordance with this configuration, a variation in the relative position of the first connected portion with respect to the second connected portion is not likely to occur. In addition, the stiffness of the rear frame can be increased. The burden in the assembling operation is not increased even when the rear frame is manufactured in the above-described manner. The "molding" is, for example, casting or forging, and does not include joining together separate parts formed by molding, by, for example, welding.

The vehicle body frame structure of the straddle-type vehicle may further comprise a support member connected to the main frame by a fastener member, the fastener member may be the first fastener member or the second fastener member, and one of the first connected portion and the second connected portion may be connected to a corresponding one of the first connection portion and the second connection portion, by the fastener member, together with the support member.

In accordance with this configuration, one of the first connected portion and the second connected portion is connected to the main frame by use of the fastener member used to connect the support member to the main frame. Since the rear frame and the support member are connected to the main frame by use of the same fastener member, the number of members of the vehicle body frame structure can be reduced. In addition, the fastener members visible from the outside of the straddle-type vehicle can be reduced, and thus the external appearance of the straddle-type vehicle can be maintained easily.

The main frame may include a pair of main frames placed in the vehicle width direction, and the fastener member used to connect the support member to the main frame includes a pair of fastener members placed in the vehicle width direction, the support member may be placed between the pair of main frames, the pair of fastener members may be inserted into the pair of main frames, respectively, in a state in which the pair of fastener members face each other in the vehicle width direction, from outside of the pair of main frames in the vehicle width direction, the support member may include a pair of fastened portions placed in the vehicle width direction, the pair of fastened portions being engageable with the pair of fastener members, respectively, and the support member may be connected to each of the pair of main frames in such a manner that the pair of main frames are pressed against the support member and the pair of fastener members are engaged with the pair of fastened portions, respectively, and one of the first connected portion and the second connected portion may be placed between the support member and the main frame.

In accordance with this configuration, the support member includes fastened portions which are engageable with the fastener members, respectively. The pair of main frames are pressed against the support member, and in this state, the fastener members are engaged with the fastened portions, respectively. For this reason, even when the main frames and the rear frames are not formed with a structure exclusively used for engaging the main frames and the rear frames with the fastener members, the rear frames can be connected to the main frames, respectively, merely by placing the rear frames between the support member and the main frames. Therefore, the rear frames and the main frames can be manufactured easily. Further, since the rear frames are located between the pair of main frames, the size of the rear frames in the vehicle width direction is not increased.

The support member may serve as one of a swing arm support section for supporting a swing arm, a suspension support section for supporting a rear suspension, and a drive unit.

In accordance with this configuration, the number of members which tend to be placed inward relative to the pair of main frames can be reduced.

The main frame may include a plurality of pipe members which are welded to each other, and one of the first restricting direction and the second restricting direction may be orthogonal to the vehicle width direction, one of the first connection portion and the second connection portion, which corresponds to the one of the first restricting direction and the second restricting direction which is orthogonal to the vehicle width direction, may be provided at a coupling member for coupling the pipe members to each other.

In accordance with this configuration, since the connection portion can be provided at the coupling member which is different from the pipe member, the main frame can be manufactured easily.

One of the first restricting direction and the second restricting direction may conform to a vehicle length direction.

In accordance with this configuration, since the rear frame extends rearward from the main frame, the fastening structure can be provided in the rear frame without affecting the size of the whole of the straddle-type vehicle, when one of the first and second restricting directions conforms to the vehicle length direction.

The first restricting direction may be orthogonal to the vehicle width direction, and the second restricting direction may conform to the vehicle width direction, and the rear frame may include an extension section extending rearward, in a location that is inward in the vehicle width direction relative to the first connected portion.

In accordance with this configuration, in a case where the rear frame includes the extension section extending rearward from the main frame, the extension section is located inward in the vehicle width direction relative to the first connected portion corresponding to the extension section, even when the first restricting section is orthogonal to the vehicle width direction. Therefore, the size of a portion of the rear frame in the vehicle width direction, the portion being in the vicinity of the first connected portion, is not increased.

The main frame may include a pair of main frames placed in the vehicle width direction, and the rear frame includes a pair of rear frames placed in the vehicle width direction, and the pair of rear frames may be independently formed.

In accordance with this configuration, since the pair of rear frames can be independently connected to the pair of main frames, respectively, the pair of rear frames can be connected to the pair of main frames, respectively, without being affected by an assembling error of the main frames in the vehicle width direction.

One of the first connection portion and the second connection portion may include a nut having a female thread which is engageable with a corresponding one of the first fastener member and the second fastener member, and protrudes from an outer surface of the main frame toward the rear frame, and one of the first connected portion and the second connected portion, which corresponds to the one of the first connection portion and the second connection portion, may have a recess which is opened toward the nut, and the corresponding one of the first fastener member and the second fastener member, may be inserted into the one of the first connected portion and the second connected portion toward the nut accommodated in the recess through a bottom wall hole of the recess.

In accordance with this configuration, since the nut having the female thread is not exposed to the outside of the straddle-type vehicle, the external appearance of the straddle-type vehicle can be maintained.

According to the present invention, a vehicle body frame structure of a straddle-type vehicle comprises a first frame; and a second frame connected to the first frame by a fastener member, wherein the first frame includes a first member and a second member which are connected to each other, the first frame includes a first connection portion and a second connection portion which are connected to the second frame, the first connection portion is provided at the first member, the second connection portion is provided at the second member, and the first connection portion and the second connection portion are spaced apart from each other in a direction which is perpendicular to a vehicle width direction of the straddle-type vehicle, wherein the second frame includes a first connected portion connected in a first restricting direction to the first connection portion by a first fastener member, and a second connected portion connected in a second restricting direction to the second connection portion by a second fastener member, wherein the first restricting direction is orthogonal to the second restricting direction, and wherein the first connection portion and the second connection portion are detachably connected to the first connected portion and the second connected portion, respectively, the first connection portion is permitted to be displaceable within a specified range in a direction which is different from the first restricting direction, the second connection portion is permitted to be displaceable within a specified range in a direction which is different from the second restricting direction, and the first connected portion and the second connected portion are integrally formed by molding.

Advantageous Effects of Invention

In accordance with the present invention, it becomes possible to provide a vehicle body frame structure which can reduce a burden in the assembling operation of a straddle-type vehicle.

DESCRIPTION OF EMBODIMENTS

Hereinafter, the embodiment will be described with reference to the accompanying drawings. Throughout the drawings, the same or corresponding components are designated by the same reference symbols, and will not be described repeatedly. The directions stated below are from the perspective of a rider straddling the straddle-type vehicle incorporating a vehicle body frame structure of the present invention. A vehicle height direction, a vehicle length direction, and a vehicle width direction correspond to a vertical direction, a forward and rearward direction, and a rightward and leftward direction, respectively. The terms "outside" and "outward" in the vehicle width direction refer to a side and a direction, respectively, which are more distant from the center of a vehicle body in the vehicle width direction. The terms "inside" and "inward" in the vehicle width direction refer to a side and a direction, respectively, which are closer to the center of the vehicle body in the vehicle width direction.

Figure 1:
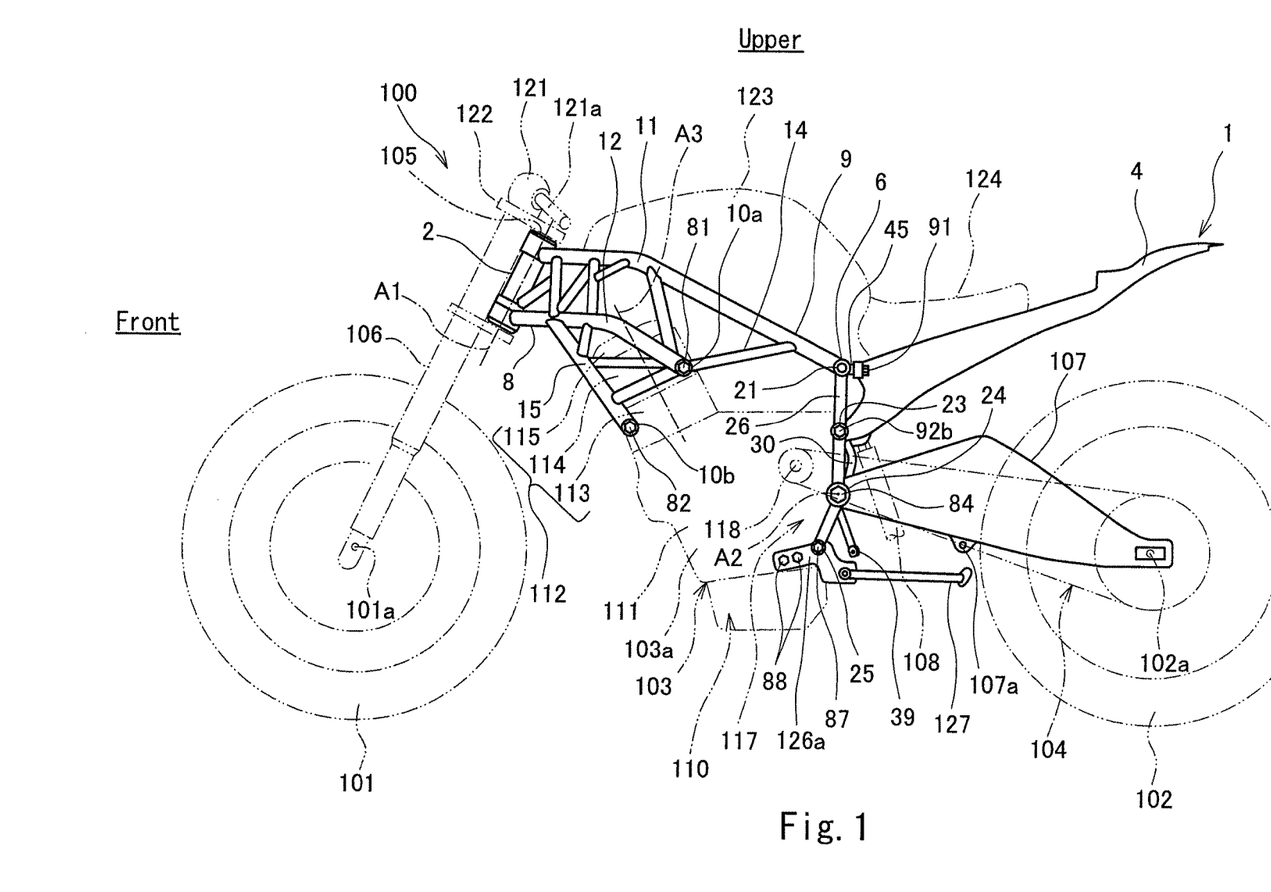
FIG. 1 is a left side view showing a vehicle body frame structure according to an embodiment which is applied to a motorcycle which is an exemplary straddle-type vehicle.

FIG. 1 is a left side view showing a vehicle body frame structure according to the embodiment which is applied to a motorcycle 100 which is an exemplary straddle-type vehicle. First of all, the configuration of the motorcycle 100 will be described in brief. As shown in FIG. 1, the motorcycle 100 includes a front wheel 101, a rear wheel 102, a drive unit 103, and a driving power transmission mechanism 104.

The front wheel 101 is mounted to a vehicle body frame 1 via a steering component such as a steering shaft 105 in such a manner that the direction of the front wheel 101 is changeable around a steering axis A1. The steering axis A1 extends substantially upward and is inclined rearward to form a caster angle. In the present embodiment, the steering component includes a front fork 106. A front axle 101a of the front wheel 101 is rotatably attached to the lower end portion of the front fork 106.

The rear wheel 102 is mounted to the vehicle body frame 1 via a swing arm 107 in such a manner that the rear wheel 102 is pivotable around a pivot axis A2. The pivot axis A2 extends in the vehicle width direction. The rear wheel 102 is placed rearward relative to the vehicle body frame 1. The swing arm 107 is pivotally mounted at a front end portion thereof to the vehicle body frame 1. The rear end portion of the swing arm 107 supports the right and left sides of a rear axle 102a of the rear wheel 102. A rear suspension 108 is placed between the vehicle body frame 1 and the swing arm 107 and connects the vehicle body frame 1 and the swing arm 107 to each other. A lever structure (not shown) is provided between the swing arm 107 and the rear suspension 108. The lever structure is supported on each of the vehicle body frame 1 and the swing arm 107 in such a manner that the lever structure is angularly displaceable. Reference symbol 107a indicates a support hole via which the lever structure is angularly displaceably supported on the lower portion of the swing arm 107. Reference symbol 39 indicates a support hole via which the lever structure is angularly displaceably supported on the vehicle body (e.g., a support member 30 which will be described later).

The rear wheel 102 is a drive wheel. The drive unit 103 includes a driving power source which generates rotational driving power. The driving power transmission mechanism 104 serves to transmit the rotational driving power output from the driving power source to the rear axle 102a. This allows the rear wheel 102 to be rotated with the rotational driving power generated by the driving power source. A casing member 103a of the drive unit 103 is mounted to the vehicle body frame 1.

The drive unit 103 includes an engine 110 which is an example of the driving power source. The drive unit 103 includes a crankcase 111 and a cylinder assembly 112 which are examples of the casing member 103a. The cylinder assembly 112 includes a cylinder block 113, a cylinder head 114, and a head cover 115. A crankshaft is rotatably supported on the crankcase 111. The cylinder assembly 112 accommodates therein a piston and a valve operating system and constitutes a combustion chamber. The cylinder block 113 is joined to the crankcase 111. The cylinder block 113 accommodates therein the piston in such a manner that the piston is reciprocatable in a direction of a cylinder axis A3. The cylinder head 114 is joined to the cylinder block 113 on an opposite side of the crankcase 111 in the direction of the cylinder axis A3, and constitutes the combustion chamber. The head cover 115 covers the cylinder head 114 on an opposite side of the cylinder block 113 in the direction of the cylinder axis A3. The head cover 115 and the cylinder head 114 accommodate therein the valve operating mechanism on the opposite side of the cylinder block 113.

The engine 110 is placed to extend horizontally, and the crankshaft of the engine 110 extends in the vehicle width direction. The engine 110 has an L-shape. The single cylinder assembly 112 is joined to the front upper portion of the crankcase 111, and the cylinder axis A3 extends upward from the front upper portion (more specifically, the cylinder axis A3 extends to be inclined slightly forward). The engine 110 is an in-line multi-cylinder engine. The cylinder axes A3 of the cylinders overlap with each other when viewed from a side. The cylinder assembly 112 is relatively elongated in the vehicle width direction.

The drive unit 103 includes a transmission as an example of a device which is integrated with the driving power source as a unit, and transmits the rotational driving power output from the driving power source to the rear wheel 102. The crankcase 111 protrudes rearward from the perspective of the cylinder assembly 112. The rear portion of the crankcase 111 constitutes a transmission case 117 which accommodates the transmission therein. The transmission changes the rotational driving power output from the driving power source, and outputs the changed rotational driving power to a transmission output shaft 118. The first end portion (e.g., left end portion) of the transmission output shaft 118 in the vehicle width direction protrudes outward in the vehicle width direction, from the side wall (e.g., left side wall) of the transmission case 117, the side wall being on a first side (one side) in the vehicle width direction.

The driving power transmission mechanism 104 is engaged with the first end portion (e.g., the left end portion) of the transmission output shaft 118 in the vehicle width direction and the first end portion (e.g., the left end portion) of the rear axle 102b in the vehicle width direction. The driving power transmission mechanism 104 extends in the vehicle length direction from the drive unit 103 toward the rear wheel 102. The driving power transmission mechanism 104 is placed on a first side (e.g., left side) in the vehicle width direction, with respect to a center line in the vehicle width direction. The driving power transmission mechanism 104 is, for example, a chain transmission mechanism.

Next, the vehicle body frame structure according to the present embodiment which is suitably applied to the motorcycle 100 having the above-described configuration will be described. The vehicle body frame 1 includes a head pipe 2, a main frame 3, and a rear frame 4.

Figure 4:
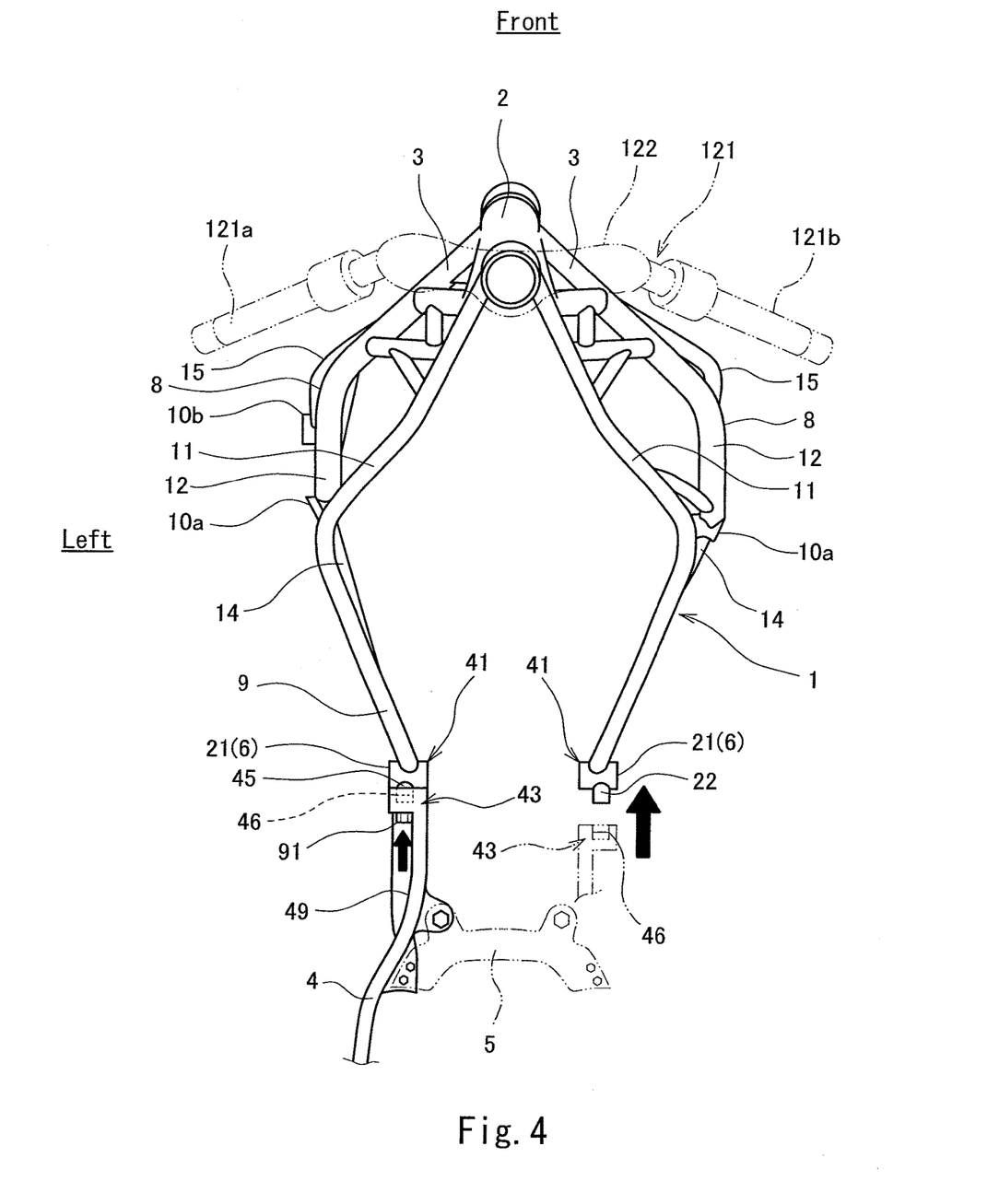
FIG. 4 is a plan view of the vehicle body frame structure of FIG. 1.

The head pipe 2 is made of metal and has a cylindrical shape with both ends opened. The head pipe 2 is located at the front end portion of the vehicle body frame 1. The above-described steering shaft 105 is connected to a handle 121 and is inserted into the head pipe 2. The steering shaft 105 is placed coaxially with the head pipe 2. The common axis of the steering shaft 105 and of the head pipe 2 constitutes the above-described steering axis A1. The steering shaft 105 is supported by the head pipe 2 in such a manner that the steering shaft 105 is rotatable around the steering axis A1. The upper end of the steering shaft 105 is coupled to the lower surface of a bracket 122. The handle 121 is attached to the upper surface of the bracket 122. The handle 121 includes a pair of grips 121a, 121b (the right grip 121b is shown in FIG. 4) protruding to the left and the right, respectively. When the rider grips the grips 121a, 121b and rotates the handle 121, the steering shaft 105 is rotated around the steering axis A1, and thus the direction of the front wheel 101 is changed.

The main frame 3 extends rearward from the head pipe 2. The rear frame 4 is connected to the main frame 3 by fastener members 91, 92, respectively, and extends rearward from the main frame 3. In the present embodiment, the main frame 3 includes a pair of main frames placed in the vehicle width direction, while the rear frame 4 includes a pair of rear frames placed in the vehicle width direction. A fuel tank 123 is placed over the main frames 3 and located rearward relative to the handle 121. A seat 124 is placed over the rear frames 4 and placed rearward relative to the fuel tank 123.

The pair of main frames 3 are welded to the head pipe 2, and extend rearward and outward to be spaced apart from each other in the vehicle width direction, from the head pipe 2. Each of the main frames 3 includes a rearward extension section extending rearward from the head pipe 2, a bent section 6 located at the rear end portion of the rearward extension section, and a downward extension section (pivot bracket member) extending downward from the bent section 6. The rearward extension section includes a front frame member 8 including front and rear engine mounts 10b, 10a to which the drive unit 103 is mounted, and a rear frame member 9 located rearward relative to the front frame member 8. The bent section 6 is provided at the rear end portion of the rear frame member 9. The side wall rear end portion of the cylinder assembly 112 (e.g., cylinder head 114) is joined to the rear engine mount 10a by a fastener member 81 such as a bolt. The side wall front end portion of the cylinder assembly 112 (e.g., cylinder block 113) is joined to the front engine mount 10b by a fastener member 82 such as a bolt. The fastener members 81, 82 are inserted into the engine mounts 10a, 10b, in an inward from outside of the engine mounts 10a, 10b in the vehicle width direction.

Each of the main frames 3 includes a plurality of rod-like frame members or pipe members which are joined to each other. The pipe members extend linearly (in a straight-line shape or a curved-line shape) and have a hollow structure made of metal, such as, for example, steel. The pipe members are directly welded to each other, or welded to joint members. The joint members are tubular members or pipe members having center axes, respectively, extending in the vehicle width direction. The outer peripheral surfaces of the joint members are welded to the end portion(s) of one or more pipe members.

Each of the front frame members 8 includes a plurality of pipe members to form a trellis structure. More specifically, each of the pair of front frame members 8 includes the plurality of pipe members placed in different directions and connected to each other, and the plurality of pipe members of one of the front frame members 8 and the plurality of pipe members of the other front frame member 8 are arranged along a pair of virtual planes placed to be spaced apart from each other in the vehicle width direction from the head pipe 2. The plurality of pipe members define a lattice structure (more specifically, a plurality of triangular shapes arranged in the vehicle length direction) formed on the virtual plane. To form the lattice structure, each of the front frame members 8 includes an upper frame 11, a lower frame 12, an arm frame 15 and a number of connection frames. The upper frame 11 extends rearward from the upper portion of the head pipe 2. The lower frame 12 extends rearward from the lower portion of the head pipe 2. The arm frame 15 extends downward from the front end portion of the lower frame 12. The connection frames serve to join the upper and lower frames 11, 12 to each other in the vehicle height direction, or join the lower frame 12 and the arm frame 15 to each other in the vehicle height direction.

The terminal (rear) end of the lower frame 12 is located in front of the terminal (rear) end of the upper frame 11. The terminal end portion of the lower frame 12 is provided with a joint member 13. A gusset frame 14 extends from the outer peripheral surface of the joint member 13 and is welded to the upper frame 11. The rear engine mount 10a is provided at the terminal end portion of the lower frame 12. The above-described joint member also serves as the rear engine mount 10a. The front engine mount 10b is provided at the rear end portion of the arm frame 15. The rear frame member 9 extends continuously from the upper frame 11. In other words, the pipe member constituting the upper frame 11 also constitutes the rear frame member 9. The rear frame member 9 is constituted by a single pipe member and extends linearly. The rear frame member 9 is flexible in the vehicle width direction.

The bent section 6 includes a bent joint member 21 which is one of the above-described joint members. The rear end portion of the pipe member constituting the rear frame member 9 is welded to the outer peripheral surface of the bent joint member 21. The bent joint member 21 is provided with a nut 45 used to detachably couple the rear frame 4 to the bent joint member 21 by use of a fastener member 91. This will be described later.

The downward extension section 7 is welded to the outer peripheral surface of the bent joint member 21 and extends downward from the bent joint member 21. The downward extension section 7 includes a plurality of joint members 23 to 25 which are placed below the bent joint member 21 and arranged in the vehicle height direction, and a plurality of pipe members 26 to 28 connecting the joint members 21, 23 to 25, which are adjacent in the vehicle height direction. The upper pipe member 26 extends downward from the outer peripheral surface of the bent joint member 21 and is welded to the outer peripheral surface of the upper joint member 23. The intermediate pipe member 27 extends downward from the outer peripheral surface of the upper joint member 23 and is welded to the outer peripheral surface of the intermediate joint member 24. The lower pipe member 28 extends downward from the outer peripheral surface of the intermediate joint member 24 and is welded to the outer peripheral surface of the lower joint member 25.

As described above, each of the main frames 3 includes the plurality of pipe members and the plurality of joint members which are coupled to each other, typically by welding. The pair of main frames 3 are firmly joined to each other via the head pipe 2. In other words, the main frames 3 do not include a cross member used to firmly join the rearward extension sections to each other, the bent sections 6 to each other, or the downward extension sections 7 to each other. For this reason, even if the main frames 3 have a dimension error due to a welding distortion or the like, the main frames 3 can be easily corrected. For example, the main frames 3 can be easily corrected so that four fastening points set in the cylinder assembly 112 overlap with the corresponding first mounts, respectively, in the vehicle width direction. The same applies to the components (the rear frame 4 or a support member 30 which will be described later) different from the drive unit 103. Therefore, the motorcycle 100 can be easily assembled.

Figure 2:
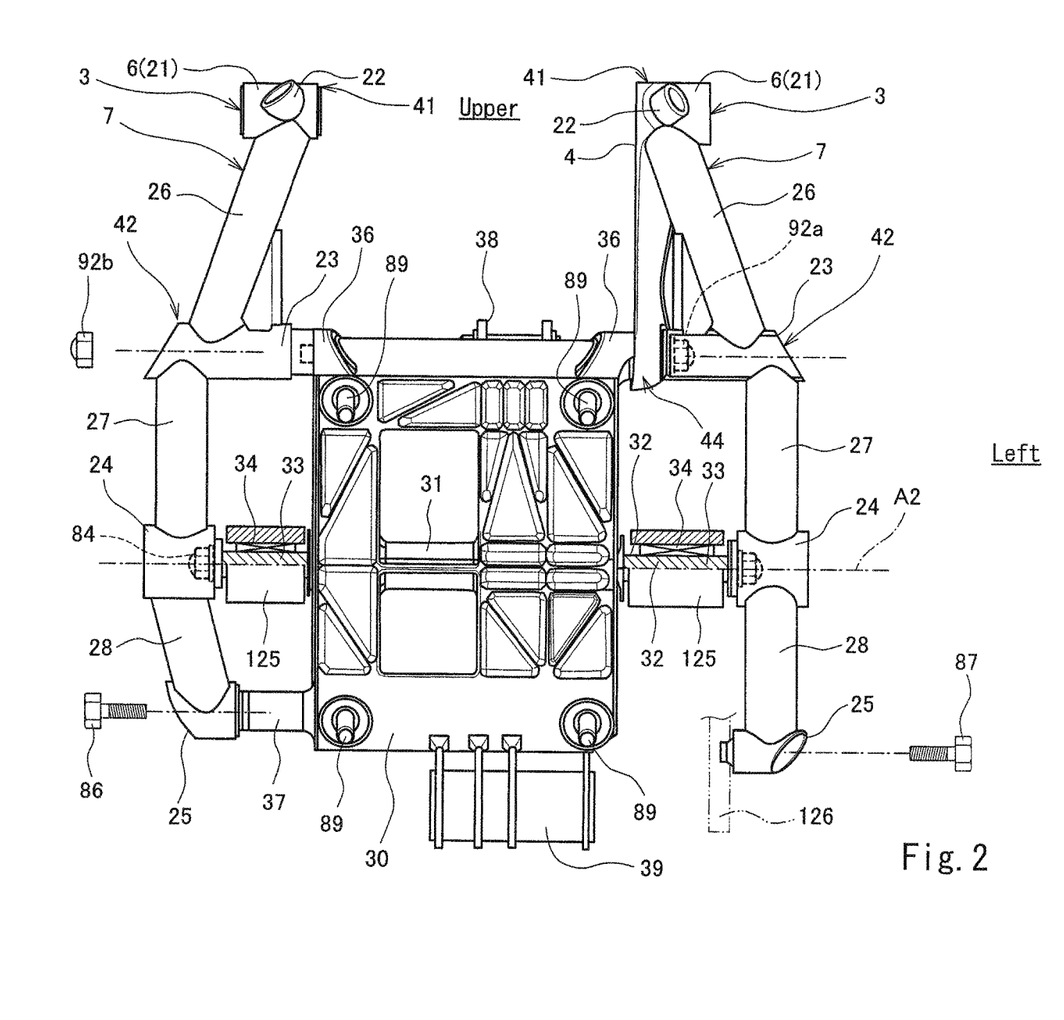
FIG. 2 is a front view of downward extension sections.

FIG. 2 is a front view of the downward extension sections 7. As shown in FIG. 2, the vehicle body frame structure further includes the support member 30 connected to the main frames 3 by fastener members such as bolts. The support member 30 is placed between the pair of main frames 3, to be precise, between the pair of downward extension sections 7. The support member 30 has a substantially rectangular plate shape. In a state in which the two surfaces of the support member 30 face the front and the rear, respectively, the left edge portion of the support member 30 is connected to the left downward extension section 7 and the right edge portion of the support member 30 is connected to the right downward extension section 7. In the present embodiment, the support member 30 serves as a bracket or a stay by which the casing member 103a is joined to the vehicle body frame 1. The support member 30 also serves as a swing arm support section for supporting the swing arm 107 and a suspension support section for supporting the rear suspension 108. Although in the present embodiment, the support member 30 is used to support various members, the support member 30 may serve as one of the swing arm support section, the suspension support section and the drive unit 103.

In a case where the support member 30 serves as the swing arm support section, the support member 30 includes a shaft insertion hole 31. The shaft insertion hole 31 penetrates the support member 30 in the vehicle width direction. A pivot shaft 32 is inserted into the shaft insertion hole 31. The right end portion of the pivot shaft 32 is formed with a male thread, while the left end portion of the pivot shaft 32 is formed with a bolt head portion. The pivot shaft 32 is inserted into the left intermediate joint member 24 from outside in the vehicle width direction, and through the shaft insertion hole 31. In a state in which the male thread protrudes into the right intermediate joint member 24, the bolt head portion is butted with the inner side surface of the left intermediate joint member 24. The male thread is threadingly engaged with a fastener member 84 such as a nut, from outside in the vehicle width direction, in the interior of the intermediate joint member 24, and thus the pivot shaft 32 is coupled to the main frames 3. Alternatively, the pivot shaft 32 may be inserted from the right and the fastener member 84 may be provided at a left side. The center axis of the pivot shaft 32 constitutes the above-described pivot axis A2 and extends in the vehicle width direction. The front end portion of the swing arm 107 includes a pair of bosses 125 placed in the vehicle width direction. The bosses 125 are externally fitted to journals 33 of the pivot shaft 32, which are located between the main frames 3 and the support member 30, respectively, and thereby are rotatably supported around the pivot axis A2. A bearing structure 34 is interposed between the inner peripheral surface of each of the bosses 125 and the outer peripheral surface of the corresponding journal 33, and serves to bear a load generated when the swing arm 107 is pivoted.

The support member 30 includes an upper frame hole 36, and a lower frame hole 37. The upper frame hole 36 includes a pair of right and left frame holes. The pair of upper frame holes 36 extend in the vehicle width direction, in a location which is above the shaft insertion hole 31, to be precise, at the upper edge portion of the support member 30. The right and left upper joint members 23 are made to overlap with the upper frame holes 36, respectively, in the vehicle width direction, and are placed outward in the vehicle width direction relative to the upper frame holes 36, respectively. A fastener member 92a such as a bolt which is elongated in the vehicle width direction, is inserted into the left upper joint member 23, from outside in the vehicle width direction, extends through the upper frame holes 36, and protrudes into the right upper joint member 23. The support member 30 is detachably coupled to the main frames 3 in such a manner that a fastener member 92b such as a nut is inserted into the right upper joint member 23 from outside in the vehicle width direction, and is engaged with the right end portion of the fastener member 92a. The left end portion of the fastener member 92a includes a head portion. The fastener member 92a is supported on the seat surface in the interior of the left upper joint member 23. The fastener member 92b is supported on the seat surface in the interior of the right upper joint member 23. Alternatively, the fastener member 92a may be inserted from the right and the fastener member 92b may be provided at a left side. This makes it possible to eliminate a need to form a threaded hole in the frame or a member placed between the frames, increase the size of the holes such as the upper frame holes, into which the fastener members 92a, 92b are inserted, respectively, simplify the structure, and reduce the weight of the structure. The fastener members 92a, 92b are also used to couple the rear frames 4 to the main frames 3, respectively. This will be described later.

The lower frame hole 37 extends in the vehicle width direction, in a location that is below the shaft insertion hole 31, to be precise, at the lower edge portion of the support member 30. The lower frame hole 37 is provided in the support member 30 only on a second side (e.g., right side) in the vehicle width direction. The lower joint member 25 located on the second side is made to overlap with the lower frame hole 37 in the vehicle width direction. The support member 30 is detachably coupled to the main frames 3 in such a manner that a fastener member 86 such as a bolt is inserted into the lower joint member 25 located on the first side, from outside in the vehicle width direction and is engaged with the lower frame hole 37.

In contrast, the lower joint member 25 located on the first side (e.g., left side) in the vehicle width direction is coupled to a stand bracket 126 which supports a side stand 127 (see FIG. 1) such that the side stand 127 is pivotable, by use of a fastener member 87 such as a bolt, instead of the support member 30. The stand bracket 126 includes a forward protruding portion 126a protruding forward and overlapping with the lower rear portion of the casing member 103a when viewed from the side. By inserting fastener members 88 such as bolts into the forward protruding portion 126a, inward in the vehicle width direction, the casing member 103a is also fastened to the stand bracket 126 (see FIG. 1).

The support member 30 is fastened to the rear portion of the casing member 103a (see FIG. 1) of the drive unit 103, by use of a plurality of fastener members 89 such as bolts. The rear surface of the casing member 103a faces the front surface of the support member 30. The fastener members 89 are inserted in a forward direction, from the rear of the support member 30, and are threadingly engaged with the casing member 103a.

In a case where the support member 30 serves as the suspension support section, the support member 30 includes a suspension mounting section 38 and a support hole 39. The suspension mounting section 38 is provided on the rear surface of the support member 30. By the suspension mounting section 38, the rear suspension 108 (see FIG. 1) is pivotally mounted at an end portion thereof to the vehicle body. The support hole 39 is provided in the lower edge portion of the support member 30, and supports the lever structure (not shown) in such a manner that the lever structure is angularly displaceable.

Figure 3:
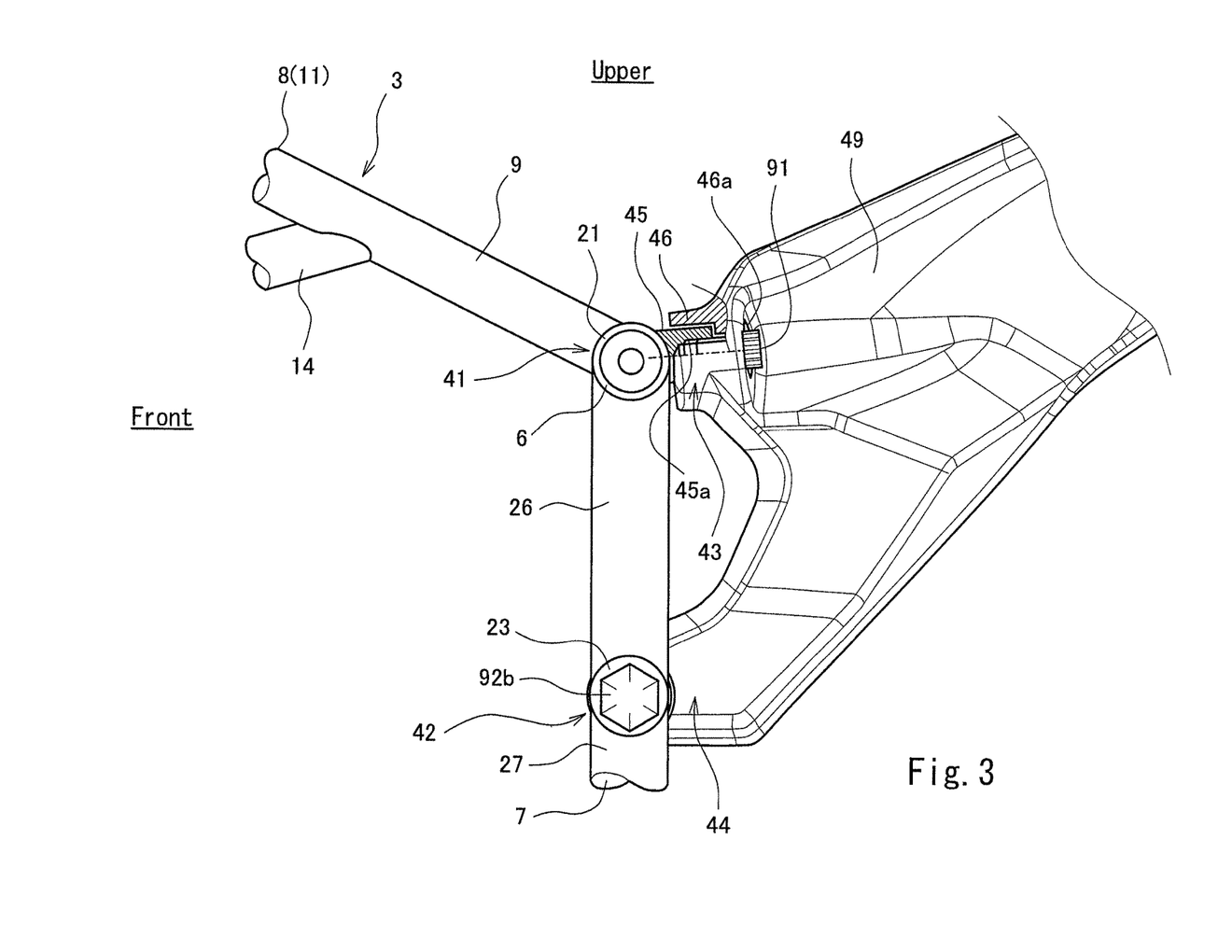
FIG. 3 is a left side view showing connection portions by which a main frame and a rear frame are connected to each other.

FIG. 3 is a left side view showing connection portions by which the main frame 3 and the rear frame 4 are connected to each other. As shown in FIG. 3, the main frame 3 includes a first connection portion 41 and a second connection portion 42 which are connected to the rear frame 4. The first connection portion 41 is provided on a "first member," among the plurality of pipe members and joint members which are coupled to each other to form the main frame 3. The second connection portion 42 is provided on a "second member" different from the first member, among the plurality of pipe members and joint members which are coupled to each other to form the main frame 3.

In the present embodiment, the "first member" is the bent joint member 21 constituting the bent section 6. The bent joint member 21 is interposed between the pipe member constituting the rear frame member 9 and the upper pipe member 26 constituting the downward extension section 7, and serves to couple these pipe members to each other. In the present embodiment, the "second member" is the upper joint member 23 constituting the downward extension section 7. The upper joint member 23 is interposed between the upper pipe member 26 and the intermediate pipe member 27, constituting the downward extension section 7, and serves to couple the pipe members 26, 27 to each other. In the present embodiment, the bent joint member 21 as the first member and the upper joint member 23 as the second member are coupled to each other via the upper pipe member 26. The joint members 21, 23 are welded to the end portion of the upper pipe member 26. In this way, the first member and the second member may not be directly coupled to each other.

The first connection portion 41 and the second connection portion 42 are spaced apart from each other (namely, within a plane parallel to the drawing sheet of FIG. 3 representing the side view) in a direction perpendicular to the vehicle width direction. More specifically, the first connection portion 41 and the second connection portion 42 are spaced apart from each other in the vehicle height direction, and the first connection portion 41 is located above the second connection portion 42.

The rear frame 4 includes a first connected portion 43 connected to the first connection portion 41 in a first restricting direction by a first fastener member 91, and a second connected portion 44 connected to the second connection portion 42 in a second restricting direction by a second fastener member 92a, 92b. The first restricting direction is defined as a direction in which the first fastener member 91 is inserted and disengaged. In a case where the first fastener member 91 is the bolt, the first restricting direction conforms to the axial direction of the bolt and a nut which is threadingly engageable with the bolt. The same applies to the second restricting direction and the second fastener member 92a, 92b. The first restricting direction is orthogonal to the second restricting direction. In the present embodiment, the first restricting direction is orthogonal to the vehicle width direction. To be precise, the first restricting direction conforms to vehicle length direction. The first fastener member 91 is inserted in a forward direction, from the rear. The second restricting direction conforms to the vehicle width direction.

The first connected portion 43 is provided at the front end upper portion of the rear frame 4. The second connected portion 44 is provided at the front end lower portion of the rear frame 4. The first connected portion 43 and the second connected portion 44 are integrally formed by molding. The "molding" is, for example, casting or forging, and does not include joining together separate parts formed by the molding, by, for example, welding. The first connected portion 43 and the second connected portion 44 of the rear frame 4 are formed with insertion holes, respectively, by a cutting process, in a state in which the first connected portion 43 and the second connected portion 44 are integrally formed. Specifically, while maintaining a state in which the rear frame 4 is fixed on a cutting machine, the insertion hole of the first connected portion 43 and the insertion hole of the second connected portion 44 are formed. This makes it possible to prevent the misalignment of the insertion holes of the connected portions 43, 44, with respect to reference positions set in the rear frame 4. Since the first connected portion 43 and the second connected portion 44 are integrally formed by the molding, it becomes possible to more effectively prevent the misalignment of the connected portions 43, 44, compared to a case where the separate members formed with the connected portions 43, 44 are connected to each other by welding.

The pair of rear frames 4 are independently manufactured by the above-described molding such as casting or forging. Each of the rear frames 4 is a molded product made of a metal material different from that of the main frames 3. The material of the rear frames 4 is chosen irrespective of the main frame 3, in view of easiness of the molding, and a light weight. Suitably, each of the rear frames 4 is manufactured by casting of aluminum alloy. The pair of rear frames 4 are independently detachably coupled to the corresponding main frames 3, respectively. The pair of rear frames 4 are coupled to the main frames 3, respectively, and then are coupled to each other in the vehicle width direction via a cross plate 5 (see FIG. 4). The cross plate 5 is placed between the pair of rear frames 4, and detachably coupled to the center portions of the pair of rear frames 4 in the vehicle length direction, by use of fastener members such as bolts.

The first connection portion 41 is detachably connected to the first connected portion 43. The second connection portion 42 is detachably connected to the second connected portion 44. The first connection portion 41 is permitted to be displaceable in directions different from the first restricting direction. The second connection portion 42 is permitted to be displaceable in directions different from the second restricting direction.

In the present embodiment, the bent joint member 21 has a stiffness lower than that of the front frame member 8 (see FIG. 1), and the first connection portion 41 is permitted to be displaceable primarily in the vehicle width direction. The lower end portion of the downward extension section 7 is not restricted by other members. For this reason, the second connection portion 42 is permitted to be displaceable primarily in the vehicle length direction. The second connection portion 42 is also permitted to be displaceable in the direction conforming to the second restricting section, namely, the vehicle width direction.

The first connection portion 41 includes a nut 45 having a female thread 45a which is engageable with the first fastener member 91. The nut 45 is welded to the outer peripheral surface of the bent joint member 21. The nut 45 protrudes toward the rear frame 4 and is open to form a circular shape in the end surface of the protruding portion of the nut 45. The first connected portion 43 has a recess 46 which is open toward the nut 45.

FIG. 4 is a plan view of the vehicle body frame structure of FIG. 1. When the rear frame 4 is coupled to the main frame 3, the rear frame 4 is moved substantially rearward with respect to the main frame 3 so that the nut 45 of the first connection portion 41 is accommodated in the recess 46 of the first connected portion 43. In a state in which the nut 45 is accommodated in the recess 46, the first fastener member 91 is inserted into the first connected portion 43 in the forward direction from the rear of the recess 46. The first fastener member 91 is inserted through a bottom wall hole 46a (see FIG. 3) of the recess 46 toward the nut 45 accommodated in the recess 46, and is engaged with the female thread 45a through the opening of the nut 45. The head portion of the first fastener member 91 is supported on the seat surface formed in a location that is inward relative to the outer side surface of the rear frame 4. In this configuration, the amount of the head portion of the first fastener member 91 which protrudes from the rear frame 4, can be reduced. As a result, the external appearance of the motorcycle 100 can be improved.

In the present embodiment, as in the case of the pipe members and the joint members of the main frame 3, the nut 45 is manufactured using an iron-based metal (e.g., steel), while the recess 46 is manufactured using aluminum alloy together with the rear frame 4. The nut 45 made of the iron-based metal can exhibit a required fastening force even in a case where the axial length of the nut 45 is short. For this reason, the first connection portion, the first connected portion and the first fastener member can be configured compactly, compared to a case where the female thread is formed in the recess 46 which is a molded product.

Turning back to FIG. 3, the upper joint member 23 constituting the second connection portion 42 is used to couple the support member 30 to the main frame 3 by use of the fastener member 92a, 92b, as described above. The second connected portion 44 of the rear frame 4 is connected to the upper joint member 23. Thus, the second fastener member 92a, 92b used to connect the support member 30 to the main frame 3 is also used to connect the second connected portion 44 to the second connection portion 42.

For example, as described above, the support member 30 is placed between the pair of main frames 3 (downward extension sections). The support member 30 includes the pair of upper frame holes 36 arranged in the vehicle width direction at the upper edge portion thereof. The left upper frame hole 36 is made to overlap with the left upper joint member 23 in the vehicle width direction, while the right upper frame hole 36 is made to overlap with the right upper joint member 23 in the vehicle width direction.

When the rear frame 4 is connected to the main frame 3, the second connected portion 44 of the right rear frame 4 is placed between the right upper edge portion of the support member 30 and the right upper joint member 23, and the second connected portion 44 of the left rear frame 4 is placed between the left upper edge portion of the support member 30 and the left upper joint member 23. In this state, the second fastener member 92a is inserted into the left upper joint member 23 in the inward direction in the vehicle width direction, from outside of the left upper joint member 23 in the vehicle width direction, and inserted through the left second connected portion 44, the left and right upper frame holes 36, and the right second connected portion 44. In this state, the second fastener member 92b is threadingly engaged with the end portion of the second fastener member 92a. The right downward extension 7 is pressed against the support member 30, and thus, the support member 30 exhibits a reactive force. Thereby, the right second connected portion 44 is retained between the right downward extension portion 7 and the support member 30 in the vehicle width direction. The left second connected portion 44 is retained between the left downward extension section 7 and the support member 30 in the vehicle width direction. In the above-described manner, the left and right second connected portions 44 are fastened to the main frames 3, together with the support member 30, by use of the second fastener members 92a, 92b, respectively.

The main frames 3 are formed with the seat surfaces on which the second fastener members 92a, 92b are supported, respectively. The seat surfaces are formed in locations which are inward in the vehicle width direction relative to the outer ends of the main frames 3 in the vehicle width direction, respectively. Preferably, the seat surfaces are located more inward in the vehicle width direction relative to the outer ends of the main frames 3 in the vehicle width direction, than the head portion of the second fastener member 92a and the axial outer end of the second fastener member 92b. This makes it possible to prevent the second fastener members 92a, 92b from protruding outward in the vehicle width direction from the main frames 3. As a result, the external appearance of the motorcycle 100 can be improved.

The vehicle body frame structure having the above-described configuration includes the main frames 3, and the rear frames 4 connected to the main frames 3 by use of the fastener members 92a, 92b, respectively and extending rearward from the main frames 3, respectively. Each of the main frames 3 includes the first member (e.g., bent joint member 21) and the second member (e.g., upper joint member 23) which are connected to each other. Each of the main frames 3 includes the first connection portion 41 and the second connection portion 42 which are connected to the rear frame 4. The first connection portion 41 is provided at the first member, while the second connection portion 42 is provided at the second member. The first connection portion 41 and the second connection portion 42 are spaced apart from each other in the direction perpendicular to the vehicle width direction. The rear frame 4 includes the first connected portion 43 connected in the first restricting direction to the first connection portion 41 by use of the first fastener member 91, and the second connected portion 44 connected in the second restricting direction to the second connection portion 42 by use of the second fastener member 92a, 92b. The first restricting direction is orthogonal to the second restricting direction. Since the first connection portion 41 and the second connection portion 42 are separately provided at the first member and the second member, respectively, an assembling error is likely to occur between the first connection portion 41 and the second connection portion 42, due to the welding distortion or the like. However, even in such a case, since the first restricting direction of the first fastener member 91 is orthogonal to the second restricting direction of the second fastener member 92a, 92b, an error occurring in directions different from the first and second restricting directions can be permitted. Therefore, an increase in an operation burden, which would be caused by the correction of the main frames 3, can be prevented.

The first connection portion 41 and the second connection portion 42 are detachably connected to the first connected portion 43 and the second connected portion 44, respectively. The first connection portion 41 is permitted to be displaceable within a specified range in the directions different from the first restricting direction. The second connection portion 42 is permitted to be displaceable within a specified range in the directions different from the second restricting direction. Because of this configuration, the rear frame 4 can be connected to the main frame 3 while suppressing the distortion of the main frame 3 and the rear frame 4.

In the present embodiment, the recess 46 has an inner diameter larger than that of the nut 45 so that a gap can be formed between the nut 45 and the recess 46 in the direction which is orthogonal to the first restricting direction (the axial direction of the first fastener member 91), in the state in which the nut 45 is accommodated in the recess 46. In this configuration, the first connected portion 43 is connected to the first connection portion 41 in such a manner that the first connection portion 41 is permitted to be displaceable in the directions different from the first restricting direction within a range corresponding to the above-described gap. Although in the present embodiment, the first connected portion 43 is formed with the recess 46 and the first connection portion 41 is formed with the nut 45 protruding, this configuration is merely exemplary. Other configurations may be used so long as a gap can be formed so that the first connected portion 43 can be joined to the first connection portion 41 while allowing the first connected portion 43 to be moved within the specified range with respect to the first connection portion 41. For example, a gap may be formed between the fastener member 91 and the connected portion to extend in the direction orthogonal to the axial direction. This makes it possible to connect the rear frame 4 to the main frame 3 while suppressing deformation of the main frame 3 and the rear frame 4.

In the above-described manner, the second connection portion 42 is permitted to be displaceable in the directions different from the second restricting direction. The insertion hole of the second connected portion 44 has an inner diameter larger than that of a shaft 36a so that a gap can be formed between the insertion hole of the second connected portion 44 and the shaft 36a to extend in the direction which is orthogonal to the second restricting direction (the axial direction of the second fastener member). In this configuration, the second connected portion 44 is connected to the second connection portion 42 in such a manner that the second connection portion 42 is permitted to be displaceable in the directions different from the second restricting direction. This makes it possible to connect the rear frame 4 to the main frame 3 while suppressing deformation of the main frame 3 and the rear frame 4.

The first connected portion 43 and the second connected portion 44 are integrally formed by the molding. This can reduce a variation in the relative position of the first connected portion 43 with respect to the second connected portion 44. In addition, the stiffness of the rear frame 4 can be increased. An operation burden is not increased even when the rear frame 4 is manufactured in the above-described manner.

The vehicle body frame structure further includes the support member 30 connected to the main frames 3 by the fastener members. The fastener members are the second fastener members 92a, 92b. The second connected portions 44 are connected to the second connection portions by the fastener members 92a, 92b, together with the support member. In this way, the second connected portions 44 are connected to the main frames 3 by the fastener members used to connect the support member 30 to the main frames 3. Since the rear frames 4 and the support member 30 are connected to the main frames 3 by the common fastener members, the number of components of the vehicle body frame structure can be reduced. In addition, the fastener members located in the external appearance of the motorcycle 100 can be reduced, and thus the external appearance of the motorcycle 100 can be maintained easily.

The support member 30 serves as at least one of the swing arm support section for supporting the swing arm 107, the suspension support section for supporting the rear suspension, and the drive unit. In the present embodiment, the support member 30 serves the swing arm support section, the suspension support section, and the bracket or stay used to mount the drive unit to the vehicle body. These members are highly likely to be placed in locations which are inward relative to the main frames 3. The rear frames 4 are coupled to the main frames 3, respectively, by use of these members used to mount the components. Therefore, the number of components and members in the whole of the motorcycle 100 can be reduced.

Each of the main frames 3 includes the plurality of pipe members which are welded to each other. The first restricting direction is orthogonal to the vehicle width direction. The first connection portion 41 is provided at the coupling member (e.g., the bent joint member) for coupling the pipe members to each other. Since the first connection portion is provided at the joint member different from the pipe members, it is not necessary to process the pipe members in a special manner, and the main frame 3 can be manufactured easily.

The first restricting direction conforms to the vehicle length direction. Since the rear frames 4 extend rearward from the main frames 3, respectively, the fastening structures can be provided at the rear frames 4 without affecting the size of the whole of the motorcycle 100, when the first restricting direction conforms to the vehicle length direction.

The first restricting direction is orthogonal to the vehicle width direction, and the second restricting direction conforms to the vehicle width direction. Each of the rear frames 4 includes an extension section 49 (see FIG. 3) extending rearward, in a location that is inward in the vehicle width direction relative to the first connected portion 43. Even when the first restricting direction is orthogonal to the vehicle width direction, the extension section 49 is located inward in the vehicle width direction relative to the corresponding first connected portion 43. Therefore, the size of a portion of the rear frame 4 in the vehicle width direction, the portion being in the vicinity of the first connected portion 43, is not increased.

The main frames 3 includes a pair of main frames placed in the vehicle width direction, while the rear frames 4 includes a pair of rear frames placed in the vehicle width direction. The pair of rear frames 4 are independently manufactured. This makes it possible to independently connect the pair of rear frames 4 to the main frames 3, respectively. Therefore, even when the main frames 3 have an assembling error in the vehicle width direction, each of the pair of rear frames 4 can be connected to the corresponding one of the pair of main frames 3 without being affected by the error.

The first connection portion 41 includes the nut having the female thread which is engageable with the first fastener member. The nut 45 constituting the first connection portion 41 protrudes from the outer surface of the main frame 3 toward the rear frame 4. The first connected portion 43 has the recess which is open toward the nut. In the state in which the nut is accommodated in the recess, the first fastener member is inserted toward the nut accommodated in the recess through the bottom wall hole of the recess. In this connection structure, the nut having the female thread is not exposed to the outside of the vehicle. Therefore, the external appearance of the motorcycle 100 can be maintained.

Figure 5:
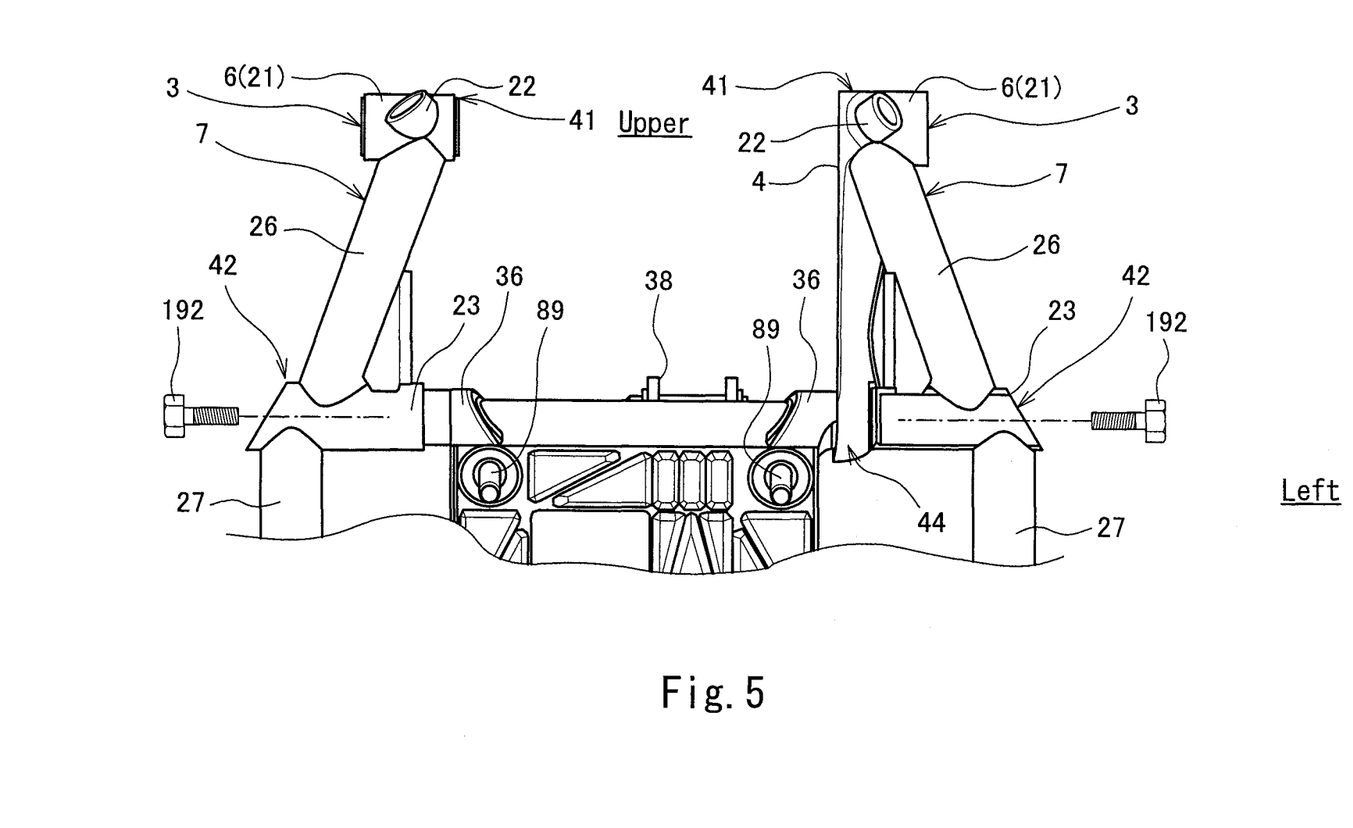
FIG. 5 is a front view of a downward extension section according to Modified Example.

Although the embodiment of the present invention has been described above, the above-described configuration can be suitably changed within the scope of the invention. For example, as shown in FIG. 5, second fastener members 192*a* may be a pair of right and left bolts. In that case, each of right and left upper frame holes 36*g* may be formed with a female thread. When the left rear frame 4 is connected to the left main frame 3, the second connected portion 44 of the left rear frame 4 is placed between the left upper portion of the support member 30 and the left upper joint member 23. In this state, the left second fastener member 192 is inserted into the left upper joint member 23 in the inward direction in the vehicle width direction, from outside of the left upper joint member 23 in the vehicle width direction, inserted through the second connected portion 44, and is engaged with the left upper frame hole 36 of the support member 30. The left downward extension section 7 is pressed against the support member 30, and thus, the support member 30 exhibits a reactive force. Thereby, the second connected portion 44 is retained between the left downward extension portion 7 and the support member 30 in the vehicle width direction, and is fastened to the main frame 3 by the left second fastener member 192, together with the support member 30. The right rear frame 4 is connected to the right main frame 3 in the same manner.

As described above, the main frame 3 includes the pair of main frames placed in the vehicle width direction, the fastener member 192 used to connect the support member 30 to the main frames 3 include a pair fastener members placed in the vehicle width direction, and the support member 30 is placed between the pair of main frames 3. The pair of fastener members 192 are inserted in such a manner that they face each other in the vehicle width direction, from outside of the pair of main frames 3 in the vehicle width direction. The support member 30 has a pair of fastened portions (e.g., upper frame holes) 36 which are placed in the vehicle width direction and engaged with the pair of fastener members 192, respectively. The pair of main frames 3 are pressed against the support member 30, and the pair of fastener members 192 are engaged with the pair of fastened portions, respectively. In this way, the support member 30 is connected to each of the pair of main frames 3. One of the second connected portions 44 is placed between the support member 30 and the main frame 3. For this reason, even when the main frames 3 and the rear frames 4 are not formed with a structure exclusively used for engaging the main frames 3 and the rear frames 4 with the fastener members 192, the rear frames 4 can be connected to the main frames 3 merely by placing the rear frames 4 between the support member 30 and the main frames 3. Therefore, the rear frames 4 and the main frames 3 can be manufactured easily. Further, since the rear frames are located between the pair of main frames, the size of the rear frames 4 in the vehicle width direction is not increased.

Although the second fastener members used to connect the support member to the main frames, respectively, are also used to connect the rear frames to the main frames, the first fastener members may be used for this purpose. The first connected portions of the rear frames may be connected to the first connection portions of the main frames by the first fastener members, respectively, together with the support member. In this case, the first connected portions may be placed between the support member and the main frames. Although the first connected portion includes the recess which accommodates the nut therein, the second connected portion may include a recess similar to the recess of the first connected portion. Further, although the first restricting direction is orthogonal to the vehicle width direction, to be precise, conforms to the vehicle length direction, and the second restricting direction conforms to the vehicle width direction, the second restricting direction may be orthogonal to the vehicle width direction, and the first restricting direction may conform to the vehicle width direction.

Although the connection between the main frames (first frames) and the rear frames (second frames) has been described above, the present invention may be applied to a combination of the first and second frames which are included in the vehicle body frame and are different from the main frames and the rear frames. Although the present invention is applied to the motorcycle 100, the present invention is also applicable to other straddle-type vehicles.

INDUSTRIAL APPLICABILITY

The present invention can obtain an advantage that a vehicle body frame structure which can reduce a burden in the assembling operation of a straddle-type vehicle, and is widely applicable to straddle-type vehicles including a motorcycle and an ATV.

LIST OF REFERENCE CHARACTERS 1 vehicle body frame
2 head pipe
3 main frame
4 rear frame
21 bent joint member
23 upper joint member
30 support member
36 upper frame hole
41 first connection portion
42 second connection portion
43 first connected portion
44 second connected portion
45 nut
45*a* female thread
46 recess
91 first fastener member 92a, 92b, 192 second fastener member
100 motorcycle
103 drive unit
107 swing arm
108 rear suspension

The invention claimed is:

1. A vehicle body frame structure of a straddle vehicle, the vehicle body frame structure comprising:
   a main frame; and
   a rear frame connected to the main frame by a fastener member and extending rearward from the main frame,
   wherein the main frame includes a first member and a second member which are connected to each other,
   the main frame includes a first connection portion and a second connection portion which are connected to the rear frame,
   the first connection portion is provided at the first member,
   the second connection portion is provided at the second member, and
   the first connection portion and the second connection portion are spaced apart from each other in a direction which is perpendicular to a vehicle width direction of the straddle vehicle,
   wherein the rear frame includes a first connected portion connected in a first restricting direction to the first connection portion by a first fastener member, and a second connected portion connected in a second restricting direction to the second connection portion by a second fastener member,
   wherein the first restricting direction is orthogonal to the second restricting direction,
   wherein the first connection portion and the second connection portion are detachably coupled to the first connected portion and the second connected portion, respectively, and
   wherein the first connection portion is permitted to be displaceable within a specified range in a direction different from the first restricting direction, and the second connection portion is permitted to be displaceable within a specified range in a direction different from the second restricting direction.

2. The vehicle body frame structure of the straddle vehicle, according to claim 1,
   wherein the first connected portion and the second connected portion are integrally formed by molding.

3. The vehicle body frame structure of the straddle vehicle, according to claim 1,
   wherein the main frame includes a plurality of pipe members which are welded to each other, and
   wherein one of the first restricting direction and the second restricting direction is orthogonal to the vehicle width direction,
   one of the first connection portion and the second connection portion, which corresponds to the one of the first restricting direction and the second restricting direction which is orthogonal to the vehicle width direction, is provided at a coupling member for coupling the pipe members to each other.

4. The vehicle body frame structure of the straddle vehicle, according to claim 1,
   wherein one of the first restricting direction and the second restricting direction conforms to a vehicle length direction.

5. The vehicle body frame structure of the straddle vehicle, according to claim 1,
   wherein the first restricting direction is orthogonal to the vehicle width direction, and the second restricting direction conforms to the vehicle width direction, and
   wherein the rear frame includes an extension section extending rearward, in a location that is inward in the vehicle width direction relative to the first connected portion.

6. The vehicle body frame structure of the straddle vehicle, according to claim 1,
   wherein the main frame includes a pair of main frames placed in the vehicle width direction, and the rear frame includes a pair of rear frames placed in the vehicle width direction, and
   wherein the pair of rear frames are independently formed.

7. The vehicle body frame structure of the straddle vehicle, according to claim 1,
   wherein one of the first connection portion and the second connection portion includes a nut having a female thread which is engageable with a corresponding one of the first fastener member and the second fastener member, and protrudes from an outer surface of the main frame toward the rear frame, and
   wherein one of the first connected portion and the second connected portion, which corresponds to the one of the first connection portion and the second connection portion, has a recess which is open toward the nut, and
   the corresponding one of the first fastener member and the second fastener member, is inserted into the one of the first connected portion and the second connected portion toward the nut accommodated in the recess through a bottom wall hole of the recess.

8. A vehicle body frame structure of a straddle vehicle, the vehicle body frame structure comprising:
   a main frame; and
   a rear frame connected to the main frame by a fastener member and extending rearward from the main frame,
   wherein the main frame includes a first member and a second member which are connected to each other,
   the main frame includes a first connection portion and a second connection portion which are connected to the rear frame,
   the first connection portion is provided at the first member,
   the second connection portion is provided at the second member, and
   the first connection portion and the second connection portion are spaced apart from each other in a direction which is perpendicular to a vehicle width direction of the straddle vehicle,
   wherein the rear frame includes a first connected portion connected in a first restricting direction to the first connection portion by a first fastener member, and a second connected portion connected in a second restricting direction to the second connection portion by a second fastener member,
   wherein the first restricting direction is orthogonal to the second restricting direction,
   wherein the straddle vehicle further comprises a support member connected to the main frame by one of the first and second fastener members,
   wherein one of the first connected portion and the second connected portion is connected to a corresponding one of the first connection portion and the second connection portion, by one of the first and second fastener members, together with the support member, and
   wherein the first connection portion is permitted to be displaceable within a specified range in a direction different from the first restricting direction, and the second connection portion is permitted to be displaceable within a specified range in a direction different from the second restricting direction.

9. The vehicle body frame structure of the straddle vehicle, according to claim 8, wherein the main frame includes a pair of main frames placed in the vehicle width direction, and the one of the first and second fastener members used to connect the support member to the main frame includes a pair of fastener members placed in the vehicle width direction, wherein the support member is placed between the pair of main frames, the pair of fastener members are inserted into the pair of main frames, respectively, in a state in which the pair of fastener members face each other in the vehicle width direction, from outside of the pair of main frames in the vehicle width direction, the support member includes a pair of fastened portions placed in the vehicle width direction, the pair of fastened portions being engageable with the pair of fastener members, respectively, and wherein the support member is connected to each of the pair of main frames in such a manner that the pair of main frames are pressed against the support member and the pair of fastener members are engaged with the pair of fastened portions, respectively, and wherein one of the first connected portion and the second connected portion is placed between the support member and the main frame.

10. The vehicle body frame structure of the straddle vehicle, according to claim 8, wherein the support member serves as one of a swing arm support section for supporting a swing arm, a suspension support section for supporting a rear suspension, and a drive unit.

11. A vehicle body frame structure of a straddle vehicle, the vehicle body frame structure comprising:

a first frame; and a second frame connected to the first frame by a fastener member, wherein the first frame includes a first member and a second member which are connected to each other, the first frame includes a first connection portion and a second connection portion which are connected to the second frame, the first connection portion is provided at the first member, the second connection portion is provided at the second member, and the first connection portion and the second connection portion are spaced apart from each other in a direction which is perpendicular to a vehicle width direction of the straddle vehicle, wherein the second frame includes a first connected portion connected in a first restricting direction to the first connection portion by a first fastener member, and a second connected portion connected in a second restricting direction to the second connection portion by a second fastener member, wherein the first restricting direction is orthogonal to the second restricting direction, and wherein the first connection portion and the second connection portion are detachably connected to the first connected portion and the second connected portion, respectively, the first connection portion is permitted to be displaceable within a specified range in a direction which is different from the first restricting direction, the second connection portion is permitted to be displaceable within a specified range in a direction which is different from the second restricting direction, and the first connected portion and the second connected portion are integrally formed by molding.

* * * * *